(12) United States Patent
Johnson et al.

(10) Patent No.: US 10,908,984 B2
(45) Date of Patent: Feb. 2, 2021

(54) ERROR HANDLING DURING ONBOARDING OF A SERVICE

(71) Applicant: Microsoft Technology Licensing, LLC, Redmond, WA (US)

(72) Inventors: Warren Johnson, Sammamish, WA (US); Sean Dastouri, Bellevue, WA (US); Ian Liu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/536,161

(22) Filed: Aug. 8, 2019

(65) Prior Publication Data

US 2019/0361762 A1 Nov. 28, 2019

Related U.S. Application Data

(63) Continuation of application No. 15/862,342, filed on Jan. 4, 2018, now Pat. No. 10,402,258, which is a continuation of application No. 14/959,973, filed on Dec. 4, 2015, now Pat. No. 9,891,982.

(51) Int. Cl.
  *G06F 11/07* (2006.01)
  *G06F 11/30* (2006.01)

(52) U.S. Cl.
  CPC ........ *G06F 11/079* (2013.01); *G06F 11/0751* (2013.01); *G06F 11/0793* (2013.01); *G06F 11/3006* (2013.01); *G06F 11/3055* (2013.01)

(58) Field of Classification Search
  CPC . G06F 11/0751; G06F 11/079; G06F 11/0793
  See application file for complete search history.

(56) References Cited

U.S. PATENT DOCUMENTS

| | | |
|---|---|---|
| 2006/0242286 A1 | 10/2006 | Hawkins et al. |
| 2015/0178658 A1 | 6/2015 | Baur et al. |
| 2016/0048401 A1 | 2/2016 | Bhat et al. |
| 2016/0217016 A1 | 7/2016 | Raman et al. |
| 2017/0060633 A1 | 3/2017 | Suarez Gracia et al. |
| 2019/0361738 A1 | 11/2019 | Johnson et al. |

FOREIGN PATENT DOCUMENTS

| | | |
|---|---|---|
| CN | 101364191 A | 2/2009 |
| CN | 102117430 A | 7/2011 |
| CN | 102122373 A | 7/2011 |

(Continued)

OTHER PUBLICATIONS

"First Office Action and Search Report Issued in Chinese Patent Application No. 201680071011.6", dated Oct. 13, 2020, 11 Pages.

(Continued)

*Primary Examiner* — Joseph R Kudirka
(74) *Attorney, Agent, or Firm* — Newport IP, LLC; Jacob P. Rohwer

(57) ABSTRACT

Described herein are techniques and systems for monitoring onboarding engagement sessions and storing onboarding information associated with completion of the tasks for the monitored onboarding engagement sessions. Using the onboarding information, an error common to a task from at least some of the onboarding engagement sessions can be determined and solutions can be identified so that they can be recommended in response to a run-time error in a current onboarding session.

20 Claims, 12 Drawing Sheets

(56) References Cited

FOREIGN PATENT DOCUMENTS

| CN | 102160035 A | 8/2011 |
|----|-------------|--------|
| CN | 102195932 A | 9/2011 |
| CN | 103120588 A | 5/2013 |

OTHER PUBLICATIONS

Labuschagne, et al., "Do Onboarding Programs Work?", In Proceedings of the IEEE/ACM 12th Working Conference on Mining Software Repositories, May 16, 2015, 5 Pages.

"Non Final Office Action Issued in U.S. Appl. No. 16/533,774", dated Nov. 13, 2020, 9 Pages.

Jiang, et al., "SODA: A Service-on-Demand Architecture for Application Service Hosting Utility Platforms", In Proceedings of the 12th IEEE International Symposium on High Performance Distributed Computing, Jun. 24, 2003, 10 Pages.

ERROR HANDLING DURING ONBOARDING OF A SERVICE

PRIORITY APPLICATION

This application is a continuation application that claims priority to co-pending U.S. Non-Provisional application Ser. No. 15/862,342 filed Jan. 4, 2018 entitled "Error Handling During Onboarding of a Service," which is a continuation application that claims priority to Ser. No. 14/959,973 (U.S. Pat. No. 9,891,982) filed Dec. 4, 2015 entitled "Error Handling During Onboarding of a Service," both of which are expressly incorporated herein.

BACKGROUND

Recently an increasing number of organizations are switching from using their own computing infrastructure to using network computing infrastructure operated and managed by a service provider (e.g., a third-party service provider). For example, a company typically employs an agent (e.g., an information technology (IT) administrator) to set up and manage the company's own on-premises servers that host electronic mail services or other services for the employees of the company. Recently, however, it can be more cost effective to have a service provider host the service using network computing infrastructure.

Onboarding refers to a process and/or a mechanism that helps a client organization (e.g., may also be referred to as a customer or a tenant) set up a service on network computing infrastructure that is operated and managed by a service provider. In many instances, setting up the service on the network computing infrastructure comprises moving at least part of a service from a client organization's own computing infrastructure to the network computing infrastructure. The goal of onboarding is to effectively and efficiently configure the service on the network computing infrastructure so that the client organization is fully engaged and individual devices within the client organization are capable of interacting with the service after the service has been onboarded (e.g., an employee device can access an electronic mailbox hosted by a cloud server instead of, or as an alternative to, an on-premises server).

Onboarding typically requires a large amount of tasks that must be implemented, for example, by an agent (e.g., an IT administrator) of the client organization. For instance, a client organization is typically provided, at the beginning of the onboarding process, with a long and exhaustive list of different tasks (e.g., over two hundred tasks), individual ones of which may not even be necessary and/or relevant to onboarding a particular service to network computing infrastructure in accordance with expectations of the client organization. This list of different tasks is often pre-ordered and is the same for all client organizations, regardless of a size of the client organization and regardless of client expectations associated with onboarding the service.

Consequently, many client organizations have a difficult time navigating through the onboarding process to not only identify relevant tasks to be completed, but also to determine an optimal and efficient order for completing the relevant tasks. Rather, the list of different tasks typically provided to a client organization at the beginning of the onboarding process provides limited or no guidance and the order in which the tasks are to be completed is not effectively updated during the onboarding process. This leads to client disengagement from the onboarding process.

SUMMARY

Described herein are techniques and systems for onboarding at least part of a service from client-managed computing infrastructure to network computing infrastructure. As part of the onboarding, a database that stores onboarding information is accessed and a set of tasks is identified. A state diagram is generated based on the onboarding information, where the state diagram models dependencies between individual tasks in the set of tasks. In some instances, the state diagram can comprise a finite state machine configured to detect a current state and a state-transition trigger to move to a next state (e.g., the next optimal state). The techniques and systems are configured to calculate, within the state diagram, a task execution path that is associated with a highest probability of success for moving the client organization from a current environment associated with the client-managed computing infrastructure to a target environment associated with the network computing infrastructure. The task execution path can be used to identify and provide subsets of tasks for the client organization to implement. In various examples, the task execution path can be re-calculated based on client feedback (e.g., indicating that implementation of an individual task was attempted but that completion of the individual task was unsuccessful). In various examples, the task execution path can be re-calculated based on a determination that an individual task has not been completed within an expected amount of time to complete the individual task.

Additionally, the techniques and systems described herein monitor onboarding engagement sessions and store onboarding information associated with completion of the tasks for the monitored onboarding engagement sessions. Using the onboarding information, an error common to a task from at least some of the onboarding engagement sessions can be determined and solutions can be identified so that they can be recommended in response to a run-time error in a current onboarding session.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
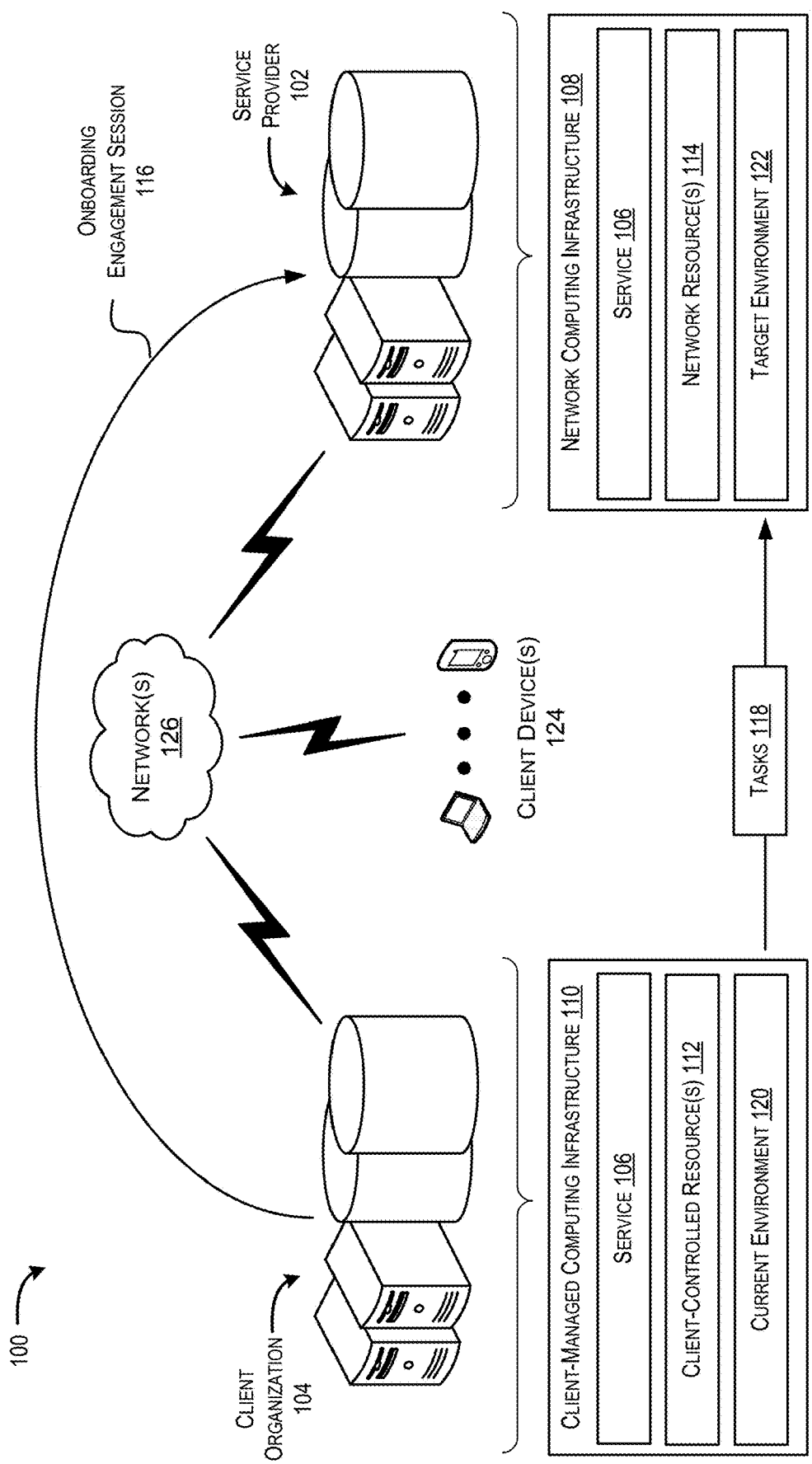
FIG. 1 illustrates an example environment in which a service provider and/or a client organization implement an onboarding engagement session to onboard a service to network computing infrastructure.

The techniques and systems described herein provide assisted onboarding for a client organization by identifying onboarding tasks that, upon implementation, move the client organization from a current environment that uses client-controlled resources to a target environment that uses network resources. The onboarding tasks, and an order of execution of the onboarding tasks, can be identified using onboarding information that has been collected from previous onboarding processes. Therefore, the techniques and systems described herein are configured to monitor a large number of onboarding processes and store onboarding information related to the monitored onboarding processes. Accordingly, historical knowledge indicating which actions have successfully and/or unsuccessfully completed tasks can be used to improve future onboarding processes and ensure continued client engagement with the onboarding process. For example, the techniques and systems described herein are able to determine: an individual task that client organizations have had a difficult time completing, an individual task that client organizations have had an easy time completing, an individual task that causes delays and/or errors, solutions that have been implemented to avoid the delays and/or resolve the errors, an optimal execution order of individual tasks to ensure client engagement with the onboarding process (e.g., reduce the likelihood of disengagement), etc. In various implementations, the techniques and systems use the historical knowledge to implement supervised learning and to guide an autonomous onboarding process based on a learned probability that completion of a selected next task effectively moves the client organization to full engagement (e.g., a complete solution to the onboarding process).

Consequently, the techniques and system described herein are able to provide an onboarding approach that is tailored to an individual client organization and that provides onboarding assistance that efficiently and effectively guides the client organization from the current environment to the target environment in accordance with the expectations of the client organization. For instance, an order of execution for tasks to be completed can be dynamically updated (e.g., can be changed), for example, based on determined state transitions and/or error states. To do this, the techniques and systems generate a state diagram (e.g., a finite state machine) based on the onboarding information, where the state diagram comprises a non-linear model that provides various paths that can be followed to move the client organization from the current environment to the target environment (e.g., a path comprises an execution order of nodes where an individual node in the state diagram represents a task). The state diagram includes a task execution path associated with a highest probability of success for onboarding the service to the network computing infrastructure. Accordingly, the state diagram is used to continually update, throughout the onboarding process, an order in which tasks are to be implemented by a particular client organization. That is, the techniques and systems described herein are able to re-calculate the task execution path within the state diagram that is associated with the highest probability of success, based on whether or not tasks have been successfully or unsuccessfully completed.

In at least one example, the order in which tasks are to be implemented by a particular client organization is based on client feedback explicitly provided by the particular client organization, the client feedback indicating whether or not a current task has been successfully completed. In at least one alternative example, the order in which tasks are to be implemented by a particular client organization is based on automated and continuous monitoring of a status of an individual task (e.g., by a service provider). For instance, a current task attempting to be completed by a particular client organization can be associated with an error state determined based on explicit client feedback or automated/detected feedback. The error state can be used to change the order of execution for a set of tasks. Consequently, it can be determined that a client organization is having a difficult time completing a particular task or that a client organization has failed to complete a particular task.

Therefore, in contrast to the conventional approach of providing a long list of pre-ordered tasks at the beginning of the onboarding process and providing little or no assistance to the client organization thereafter, the techniques and systems described herein are configured to use onboarding information to identify and/or recommend tasks throughout the onboarding process. This increases the likelihood that a client organization remains engaged until the onboarding process is completed (e.g., the client organization is able to use the service hosted by the network computing infrastructure).

FIG. 1 illustrates an example environment 100 in which a service provider 102, on behalf of a client organization 104, onboards a service 106. As described above, onboarding refers to the process and/or the mechanism that enables the client organization 104 to set up the service 106 on network computing infrastructure 108 that is operated and managed by the service provider 102. In many instances, setting up the service 106 on the network computing infrastructure 108 comprises moving at least part of a service 106 from client-managed computing infrastructure 110 to the network computing infrastructure 108. The client-managed computing infrastructure 110 includes client-controlled resources 112 (e.g., processing resources, storage resources, security resources, networking resources, etc.). For example, the client-controlled resources 112 can include on-premises servers or other devices that host an electronic mail service for the client organization 104 (e.g., wherein the on-premises servers are located in a physical structure from which the company operates). In an alternative example, at least some of the client-controlled resources 112 can also include resources that are not on-premises, but rather off-premises, yet still under control and management of the client organization 104.

The network computing infrastructure 108 includes network resources 114. For example, the network resources 114 can include servers or other devices that comprise a datacenter, a server farm, or other cloud-configured resources. In various implementations, the network resources 114 are scaled resources such that they can be shared across a number of different client organizations (e.g., including client organization 104). In various scenarios, the client organizations can pay a fee (e.g., a monthly or annual subscription fee) contracting the service provider 102 to host, via the network resources 114, at least part of the service 106.

Setting up at least part of the service 106 on the network computing infrastructure 108 can be implemented within an onboarding engagement session 116. As described above, in many instances, the goal of the onboarding engagement session 116 is to effectively and efficiently move at least part of the service 106 from the client-managed computing infrastructure 110 to the network computing infrastructure 108 so that the client organization 104 can fully engage the service 106 on the network computing infrastructure 108.

As part of the onboarding engagement session 116, the service provider 102 generates a set of tasks 118 that assists in setting up the service 106 on the network computing infrastructure 108. In some examples, setting up the service 106 on the network computing infrastructure 108 comprises moving at least part of the service 106 from a current environment 120 that uses the client-controlled resources 112 to a target environment 122 that, at least partly, uses the network resources 114. In various implementations, the client organization 104 (e.g., a representative or an agent such as an IT administrator that is contracted or employed by the client organization 104) is responsible for completion of a task, or at least part of a task. In various implementations, the service provider 102 (e.g., an on-call-engineer (OCE) contracted or employed by the service provider 102) is responsible for completion of a task, or at least part of a task. In various implementations, both the client organization 104 and the service provider 102 work together to complete a task (e.g., the responsibility is shared).

The current environment 120 represents how the service 106 is currently set up and configured using the client-controlled resources 112. For instance, the current environment 120 can define characteristics of the service (e.g., a number of organizational users of the service, identifications of the organizational users, a number of devices used by the organization users of the client organization 104, a storage capacity for an individual mailbox, etc.), capabilities of the service (e.g., enablement of mobile access to an electronic mailbox), and/or functionality that is enabled for the service (e.g., enablement of security features, user preferences and/or privileges, etc.). Consequently, the current environment 120 can represent hardware and/or software configurations of the service 106 on the client-managed computing infrastructure 110.

The service provider 102 is configured to determine the target environment 122 so that the characteristics, capabilities and/or functionality of the service in the current environment 120 can be similarly situated using the network resources 114 of the network computing infrastructure 108. The target environment 122 can be determined based on input provided by the client organization 104, where the input defines expectations of the client organization 104. For example, the input and expectations can comprise operational requirements, instructions to enable or disable particular features, a timeline for moving the service (e.g., onboard 10% of employee mailboxes during a first month, onboard 20% of employee mailboxes during a second month, onboard 30% of employee mailboxes the third month, and so forth), etc. Consequently, depending on the expectations of the client organization 104 and the number and difficulty of relevant onboarding tasks 118 to be completed, an onboarding engagement session 116 can take hours, days, weeks, months, or even years to complete.

In various examples, the service 106 can comprise an electronic mailbox service (e.g., an electronic mail exchange service), a document sharing service, a document storage service, a video conferencing service, a social network service (e.g., for an enterprise), and so forth. In some instances, the service 106 can comprise a combination of multiples ones of the electronic mailbox service, the document sharing service, the document storage service, the video conferencing service, the social network service, etc. Thus, via the onboarding engagement session 116, at least part of the service 106 is configured and set up for client device(s) 124 associated with the client organization 104 (hereinafter referred to as a client device 124).

A client device 124 can be any device, including, without limitation, a personal computer device, a laptop computer device, a desktop computer device, a portable digital assistant (PDA) device, a mobile phone device, a smartphone device, a tablet computer device, an electronic book (eBook) reader device, a set-top box device, a game console device, a smart television device, a wearable device (e.g., a smart watch, electronic "smart" glasses, a fitness tracker, etc.), or any other electronic device. In some examples, a client device 124 can be a server, or other network-accessible device that is part of the client-managed computing infrastructure 110.

In one example, onboarding is implemented to realize a "hybrid" service that uses both the client-managed computing infrastructure 110 and the network computing infrastructure 108 (e.g., an electronic mail hybrid service in which an individual user has a mailbox stored on-premises and a linked mailbox stored in the cloud). This enables the client organization 104 to extend the experience and administrative control it has with existing client-managed computing infrastructure 110 (e.g., on-premises infrastructure) to the network computing infrastructure 110. An example task 118 to be implemented to realize the electronic mailbox hybrid service can be adding an acceptable domain to the client-managed computing infrastructure 110 to allow for mail flow. Another example task 118 to be implemented to realize the electronic mailbox hybrid service can be updating an Active Directory object in the client-managed computing infrastructure 110 so that it contains hybrid deployment configuration parameters useable to configure both on-premises mailbox settings and a linked network mailbox settings (e.g., secure mail routing between the on-premises mailbox and the linked network mailbox, mail routing with a shared domain namespace, a unified global address list (GAL) shared between the on-premises mailbox and the linked network mailbox, calendar sharing between the on-premises mailbox and the linked network mailbox, etc.).

The onboarding engagement session 116 can be implemented over network(s) 126. Moreover, the client organization 104 and/or the client device 124 are configured to use the service 106 over network(s) 126 (e.g., access an electronic mailbox, share a document in a collaboration environment, engage in a videoconference, etc.). To this end, network(s) 126 can comprise a wide area network (WAN), a local area network (LAN), a personal area network (PAN), a network specific to a datacenter (e.g., an Intranet, a storage area network (SAN)), etc. A network can also comprise switches that connect various devices (e.g., the servers and/or storage devices illustrated in FIG. 1) to routers and/or other devices that can act as bridges between data networks. Communications between devices can utilize any sort of communication protocol known in the art for sending and receiving information and/or messages, such as the Transmission Control Protocol/Internet Protocol (TCP/IP) and/or the User Datagram Protocol (UDP).

As described above, the tasks 118 can be identified using a state diagram (e.g., a finite state machine) that has been generated based on previously collected onboarding information. The service provider 102 can provide, or recommend, the tasks 118 to the client organization 104 as part of a deployment plan. Accordingly, the state diagram can be used to update, throughout the onboarding engagement session 116, an order in which the tasks 118 are to be implemented. As an example, a domain validation task can be a precursor to a task that provides organization identifiers (ORGIDs) that employees can use to connect mobile devices (e.g., client device 124) to an onboarded service (e.g., service 106).

In various implementations, the onboarding information used to generate a state diagram can be specific to particular segments of client organizations, where differing segments can be based on differing sizes of client organizations (e.g., a number of users, a number of devices, etc.). For example, efficient and effective onboarding assistance provided to a small enterprise with only three employees is likely to be different compared to efficient and effective onboarding assistance provided to a large enterprise with hundreds or thousands of employees and its own information technology (IT) department.

Figure 2:
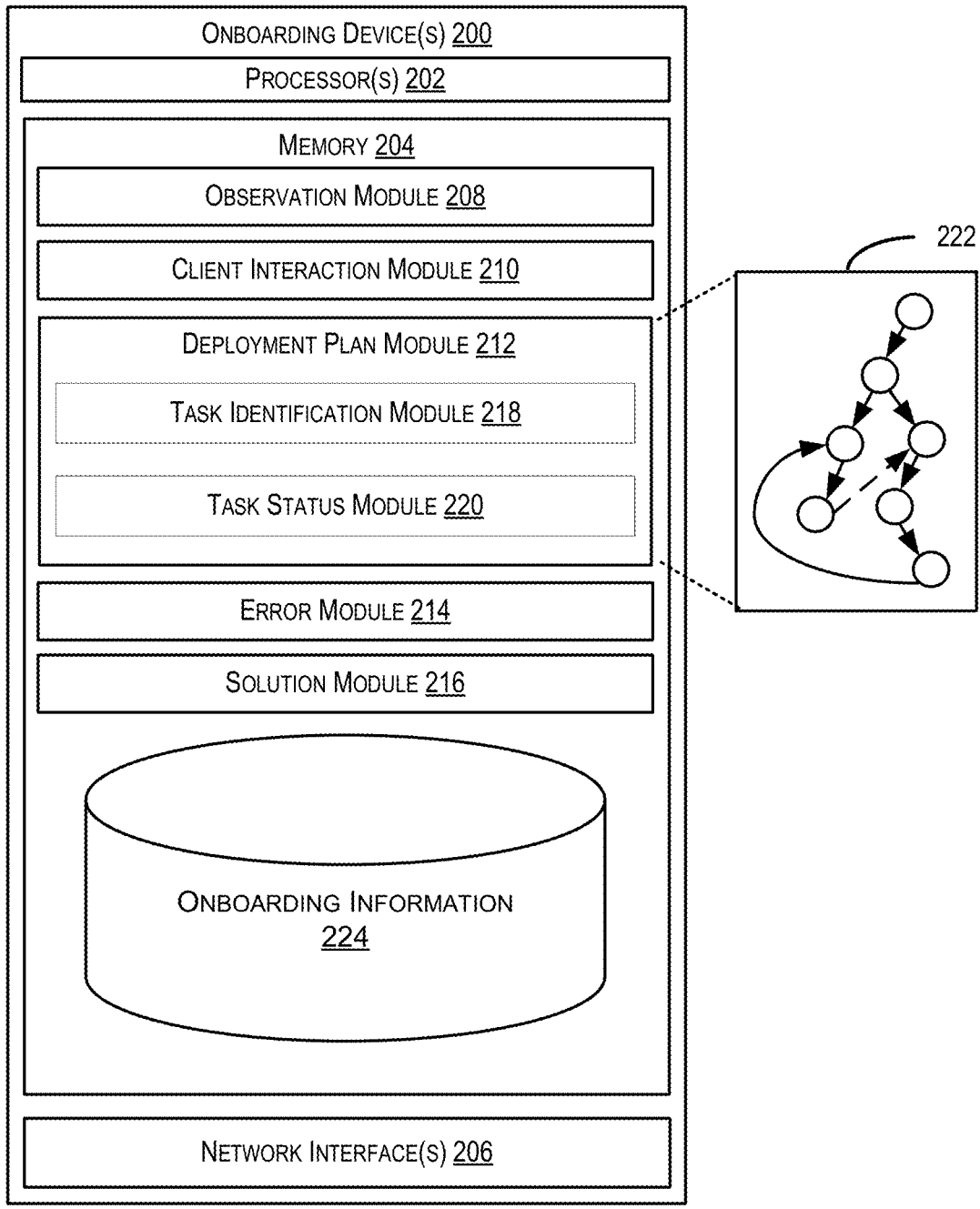
FIG. 2 is a schematic diagram illustrating components of an example onboarding device, which can be part of the service provider that assists with onboarding the service to the network computing infrastructure.

FIG. 2 is a schematic diagram illustrating components of an example onboarding device 200, which can be part of the service provider 102 that onboards the service 106 to the network computing infrastructure 108.

The onboarding device 200 can include one or more processor(s) 202 and memory 204, as well as network interface(s) 206 so that the onboarding device 200 can communicate with the client organization 104 (e.g., a client device 124). The processor(s) 202 can be a single processing unit or a number of units, each of which could include multiple different processing units. The processor(s) 202 can include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 202 can be configured to fetch and execute computer-readable instructions stored in the memory 204.

The memory 204 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 204 can also include an operating system configured to manage hardware and services within and coupled to the onboarding device 200 for the benefit of other components and other devices. By way of example, the memory 204 can include an observation module 208, a client interaction module 210, a deployment plan module 212, an error module 214, and a solution module 216, each of which is further described herein. For ease of discussion, the deployment plan module 212 can further include a task identification module 218 and a task status module 220, each of which can be configured to use a state diagram 222 to perform functions. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions. In various implementations, the modules described herein in association with the onboarding device 200 can be executed across multiple devices.

Figure 3:
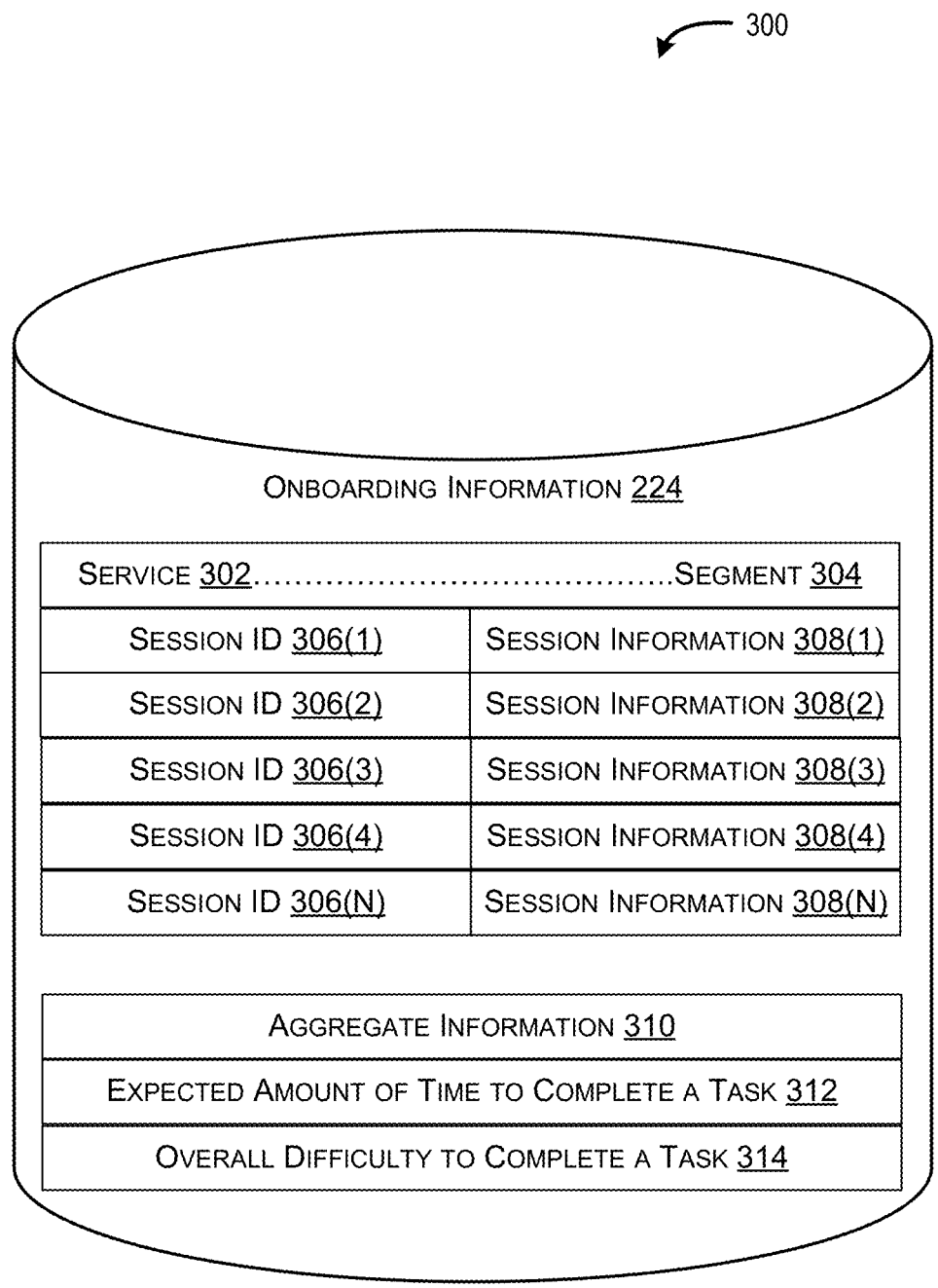
FIG. 3 illustrates an example database in which onboarding information, collected from a plurality of monitored onboarding engagement sessions, can be stored and accessed to assist with onboarding the service to the network computing infrastructure.

In various implementations, the memory 204 can also include onboarding information 224. FIG. 3 illustrates an example database 300 in which onboarding information 224, collected from a plurality of monitored onboarding engagement sessions, can be stored.

In various examples, the observation module 208 is configured to observe and/or receive, at the commencement of the onboarding engagement session 116, the current environment 120 of the client-managed computing infrastructure 110 that hosts a service 106. As described above, the current environment 120 represents how the service 106 is currently set up and configured using the client-controlled resources 112. For instance, the current environment 120 can define characteristics of the service 106 (e.g., a number of organizational users of the service, identifications of the organizational users, a number of devices used by the users of the client organization 104, storage capacity for an individual mailbox, etc.), capabilities of the service 106 (e.g., enablement of mobile access to an electronic mailbox), and/or functionality that is enabled for the service 106 (e.g., policies or user privileges associated with an electronic mailbox, enablement of security features, individual user mailbox preferences, etc.). The current environment 120 can also define a type of hardware used to host the service 106 (e.g., security hardware, videoconferencing equipment, etc.). The observation module 208 is further configured to monitor and/or receive information associated with the completion of tasks within an onboarding engagement session. In some instances, the monitored information associated with the completion of tasks can be stored as onboarding information 224 so that it can be accessed and used for future onboarding engagement sessions, as further described herein with respect to FIG. 3. For example, the stored onboarding information 224 can be used to implement supervised learning and to guide an autonomous onboarding process based on a learned probability that completion of a selected next task effectively moves the client organization to full engagement (e.g., a complete solution to the onboarding process).

In various examples, the client interaction module 210 is configured to receive client input defining expectations from which a target environment 122 of the service 106 can be determined. For example, the client input can be received at the beginning of the onboarding engagement session 116 or during the onboarding engagement session 116 and can comprise operational requirements of the service 106, instructions to enable or disable particular feature of the service 106, a timeline for moving the service 106 from the client-managed computing infrastructure 110 to the network computing infrastructure 108, etc. The client interaction module 210 can also receive client input associated with a status of completion of a task (e.g., time to complete, an indication of difficulty to complete, etc.).

In various examples, the deployment plan module 212 is configured to generate a deployment plan to onboard the service 106 to the network computing infrastructure 108. As described above, the deployment plan comprises a set of tasks 118, and the deployment plan module 212 is configured to generate a state diagram 222 and then use the state diagram 222 to create the deployment plan. The deployment plan module 212 is also configured to continually update the deployment plan throughout the onboarding engagement session 116 (e.g., based on explicit client feedback, based on automated and continuous monitoring of feedback, based on supervised learning, etc.).

The deployment plan module 212 generates the state diagram 222 using the onboarding information 224. The onboarding information 224 includes information monitored from previous onboarding engagement sessions and/or information derived or calculated from the information monitored from the previous onboarding engagement sessions. For instance, FIG. 3 illustrates an example database 300 storing onboarding information 224, where the onboarding information 224 can be organized according to a type of service 302 to be onboarded and/or a particular segment 304. A segment 304 is based on a size of a client organization 104 (e.g., a number of users to be supported by the onboarded service, a number of devices to be supported by the onboarded service, etc.). There are multiple different way to distinguish one segment from the next, but one example is to define segments based on ranges (e.g., one to ten employees or devices comprises a first segment, eleven to fifty employees or devices comprises a second segment, fifty to five hundred employees or devices comprises a third segment, etc.). Thus, for each combination of a service 302 and a segment 304, the onboarding information 224 includes session identifiers (IDs) 306(1) . . . 306(N) for the previously monitored onboarding engagement sessions and each session ID 306(1) . . . 306(N) is associated with monitored session information 308(1) . . . 308(N). In various examples, the monitored session information 308(1) . . . 308(N) includes, for each task completed in a monitored onboarding engagement session, an amount of time to complete the task and an indication associated with difficulty of completion (e.g., a sentiment such as "hard", "normal", "easy"). For example, the monitored session information 308(1) can indicate that a task associated with a Domain Name System (DNS) update took three days to complete and that completion of the DNS update was "hard", and not "easy", for a particular client organization 104. Accordingly, the monitored session information 308(1) . . . 308(N) can reveal tasks that cause extended delays within an onboarding engagement session and/or cause a client organization to abandon, or disengage from, the onboarding engagement session.

Using the monitored session information 308(1) . . . 308(N) collected across a number of session IDs 306(1) . . . 306(N), the deployment plan module 212 can calculate or derive aggregate information 310 for a particular segment. The aggregate information can include, for example, an expected amount of time to complete a task 312 (e.g., a calculated average time to complete a task based on the actual times to complete monitored within each session ID 306(1) . . . 306(N)) and an overall difficulty to complete a task 314 (e.g., a sentiment such as "easy", "medium", "hard", etc.). The overall difficulty to complete a task 314 can also be an average derived from the monitored session information 308(1) . . . 308(N) stored for the individual session IDs 306(1) . . . 306(N). Thus, in various examples, client organizations have the capability to provide input as to which tasks are difficult. Moreover, the service provider is also able to continuously monitor an onboarding engagement session and determine which tasks are difficult (e.g., based on a determination that completion of a task is taking longer than an expected amount of time to complete 312).

Consequently, the onboarding information 224 used by the deployment plan module 212 to generate the state diagram 222 can be specific to particular segments of client organizations. To this end, the deployment plan module 212 can use the onboarding information 224 to identify an overall set of tasks (e.g., tasks 118), to be modeled by the state diagram 222, that are relevant to the client organization and the expectations of the client organization. Stated another way, by using the onboarding information 224, the deployment plan module 212 can reduce the typical long and exhaustive list of tasks (e.g., hundreds of tasks) and avoid including tasks that are irrelevant to a particular segment.

Dependencies amongst the tasks are defined within the state diagram 222 based on the onboarding information 224 so that the state diagram 222 includes multiple paths that an onboarding engagement session 116 can follow (e.g., the state diagram 222 is a non-linear diagram). Referring back to FIG. 2, the task identification module 218 is configured to identify, using the state diagram 222, a first subset of tasks to be completed within the onboarding engagement session 116.

In contrast to the conventional approach to onboarding that provides a long and exhaustive list of pre-ordered tasks, the identification of the first subset of tasks performed by the task identification module 218 does not include all the tasks 118 required to onboard the service 106. Rather, the first subset of tasks includes an initial small set of tasks (e.g., one task, two tasks, three tasks, four tasks, five tasks, and so forth) that are included along a task execution path in the state diagram 222 that provides a highest probability of success for moving the client organization 104 from the current environment 120 to the target environment 122. Thus, for each node that represents a task in the state diagram 222, the deployment plan module 212 performs statistical inferences into the onboarding information 224 (e.g., uses a theory such as Bayes' theorem) to calculate a probability of successful completion of the task (e.g., an "event") based on conditions and/or dependencies (e.g., successful completion of other tasks or other "events"). The task identification module 218 then evaluates the respective probabilities (e.g., individually and as a combination as the probabilities build on each other) to determine a task execution path in the state diagram 222 that provides a highest probability of success. The task identification module 218 can then identify (e.g., select) the first subset of tasks (e.g., but not all the tasks) that are along the calculated task execution path. The task identification module 212 finally provides, to the client organization 104 as part of a deployment plan, the first ordered subset of tasks. In various examples, the task execution path can comprise a partial Eulerian Path.

After providing the first ordered subset of tasks, input associated with the status of completion of an individual task is received. The input can indicate that the individual task has been successfully completed or unsuccessfully completed (e.g., the client organization 104 failed and is unable to complete the task, completion of the task is delayed due to difficulty, the task has not been completed in an expected amount of time, etc.). In various examples, the input can be client-provided feedback that explicitly indicates the status, the client-provided feedback received via the client interaction module 210. In alternative examples, the input can be implied input based automated and continuous monitoring performed by the observation module 208. For instance, the observation module 208 can receive information and determine that a client organization 104 has not successfully completed a task within the expected amount of time to complete the task 312.

Based on the input, the task status module 220 can update nodes in the state diagram 222 so that the tasks (e.g., the first subset of tasks attempted to be implemented) are labeled as being "successfully completed" or "unsuccessfully completed". The task identification module 218 then identifies (e.g., selects) a second subset of tasks that are along the task execution path after completion or non-completion of the first subset of tasks. The task identification module 212 provides, to the client organization as part of an updated deployment plan, the second subset of tasks.

In various examples, the task execution path does not change if all the tasks in the first subset of tasks have been successfully completed. Accordingly, the second subset of tasks is selected form the same task execution path from which the first subset of tasks was selected. However, in alternative examples where the task status module 220 updates the state diagram 222 to reflect that a task in the first subset of tasks has not been successfully completed, the deployment plan module 212 can re-calculate the probabilities within the state diagram 222 and the task execution path. Therefore, the task execution path re-calculated based on the input can change (e.g., the initial path determined prior to selection the first subset of tasks may be different than the subsequent path determined after input indicates that a task in the first subset of task was not successfully completed).

Consequently, the deployment plan module 212 is configured to use stored onboarding information 224 from similarly situated client organizations to generate a state diagram 222 for a current onboarding engagement session 116. The deployment plan module 212 can then continuously recommend a small number of tasks to be completed (e.g., one task, two tasks, three tasks, four tasks, five tasks, and so forth) based on input indicating successful or unsuccessful completion of tasks and/or transitions between the tasks. This more refined and granular onboarding assistance based on continuous re-evaluation of the task execution path with the highest probability of success results in higher client satisfaction associated with the onboarding process. Stated another way, the deployment plan module 212 uses previously learned historical knowledge for a particular segment to understand (i) where the client organization 104 is within the onboarding engagement session 116 (e.g., which tasks have been successfully completed and which tasks have been attempted but have been unsuccessfully completed) and (ii) which next task is the best task the client organization 104 should attempt to implement within the onboarding engagement session to reduce the likelihood of client disengagement. In various implementations, the deployment plan module 212 uses the saved onboarding information 224 to implement supervised learning and to guide an autonomous onboarding process based on a learned probability that completion of a selected next task effectively moves the client organization to full engagement.

As described above, the observation module 208 is configured to monitor, receive and store information associated with a plurality of onboarding engagement sessions. In various examples, the error module 214 is configured to evaluate the stored information (e.g., the onboarding information 224) and determine an error that is common to a task in at least some of the plurality of onboarding engagement sessions. The error likely prevents or delays completion of the task.

The solution module 216 can be configured to also evaluate the stored information and identify one or more solutions implemented to resolve the error (e.g., previous actions taken to resolve the error). In various examples, an error and a solution can each be added to a supervised data set for incremental learning (e.g., machine learning). The error module 214 and the solution module 216 can store information associated with common errors and solutions to the common errors in the database of onboarding information 224 (e.g., in accordance with particular segments). Accordingly, upon detection of a run-time error in a current onboarding engagement session 116, the error module 214 can determine if the run-time error is a common error and/or the solution module 216 can provide, to a client organization, solutions to the run-time error. As an example, the error module 214 can detect the run-time error in response to determining that a current task has not been successfully completed within an expected amount of time to complete the task.

In various examples, the solution module 216 can recommend a solution out of a plurality of possible solutions. Moreover, the solution module 216 can calculate and/or provide a confidence rating associated with a recommend solution. For instance, the error module 214 can detect that a client organization has encountered an error and is unable to complete a DNS update task. Using the onboarding information 224, the solution module 216 previously determined that 85% of the time this error can be resolved by visiting a third party Domain Name registrar and entering a password. Thus, the solution module 216 can provide, as a recommended solution, instructions to visit a third party Domain Name registrar and enter a password so the DNS update task can be successfully completed. Of course, other confidence ratings can be associated with alternative solutions (e.g., 5% confidence rating for a second solution, a 3% confidence rating for a third solution, etc.). In some instances, when there is only one possible solution, the confidence rating may be 100% or close to 100%.

Figure 4:
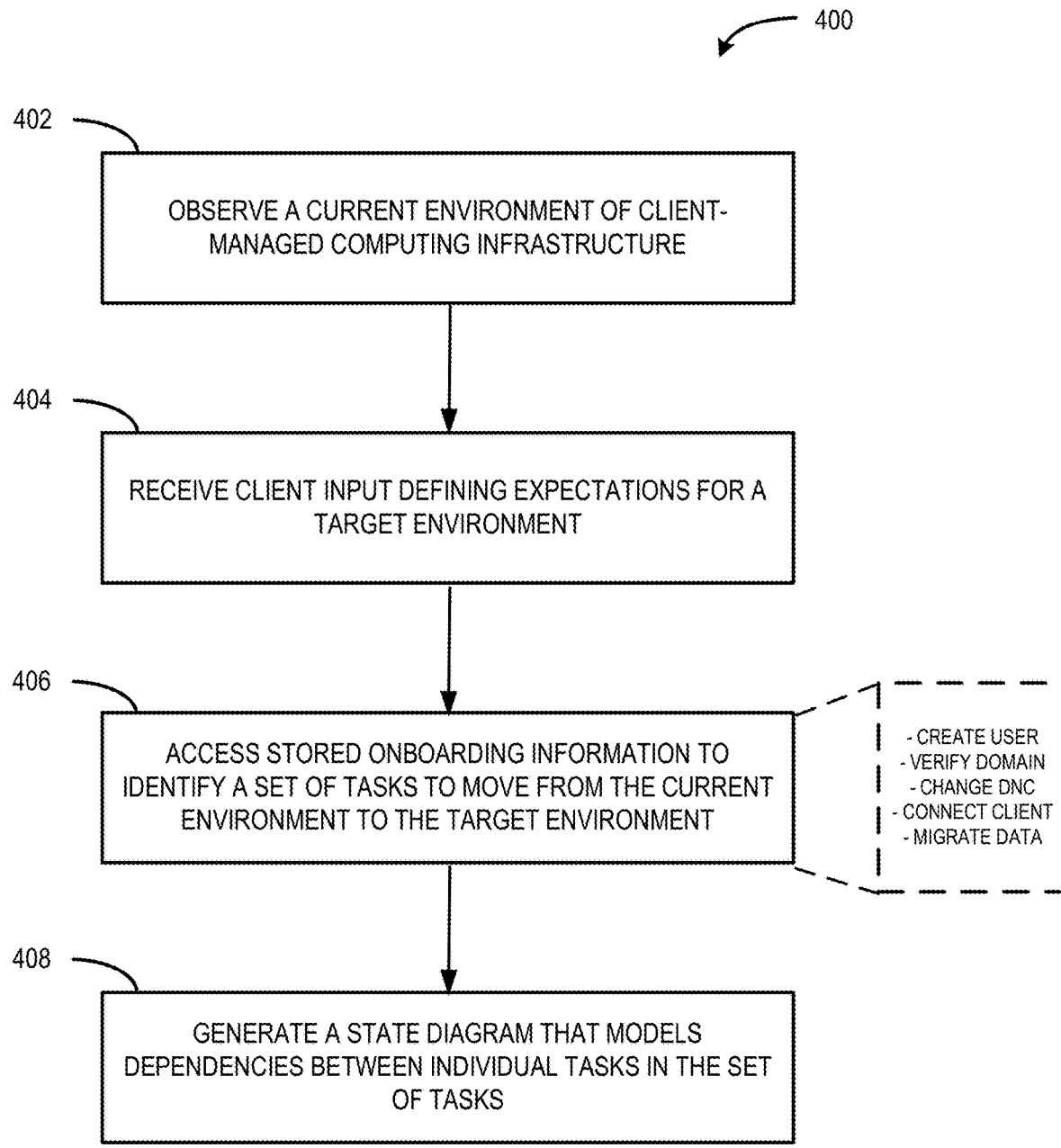
FIG. 4 illustrates a flow diagram of an example process that generates a state diagram that models dependencies between individual tasks in a set of tasks identified by the service provider to onboard a service on behalf of a client organization.

FIG. 4, as well as FIG. 5 and FIGS. 8-12, individually illustrate an example process for employing the techniques described herein. For ease of illustration, the example processes are described as being performed in the environment 100 of FIG. 1. Moreover, the example processes may be implemented by an onboarding device 200. However, the example processes can be performed in other environments and by other devices as well.

The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

FIG. 4 illustrates a flow diagram of an example process 400 that generates a state diagram that models dependencies between individual tasks in a set of tasks identified by the service provider to onboard a service on behalf of a client organization.

At 402, a current environment 120 of client-managed computing infrastructure 110 is observed and/or information associated with the observation is received. As described above, the current environment 120 represents how a service 106 is currently set up and configured using client-controlled resources 112. The current environment 120 can define characteristics of the service 106 (e.g., a number of organizational users of the service, identifications of the organizational users, a number of devices used by the organization users of the client organization 104, a storage capacity for an individual mailbox, etc.), capabilities of the service 106 (e.g., enablement of mobile access to an electronic mailbox), and/or functionality that is enabled for the service 106 (e.g., enablement of security features, user preferences and/or privileges, etc.). The observation module 208 can observe and/or receive the current environment 120.

At 404, client input defining expectations for a target environment 122 is received (e.g., from the client organization 104). For example, the client input and expectations can comprise operational requirements, instructions to enable or disable particular features, a timeline for moving the service, and so forth.

At 406, onboarding information 224 is accessed to identify a set of tasks 118 to move from the current environment 120 to the target environment 122. In various examples, the tasks 118 identified are selected from a large group of tasks based on their relevancy to (i) a type of the service 106 being onboarded and (ii) the particular segment with which the client organization 104 is associated (e.g., the client organization 104 can be a small company with five employees or a large company with five hundred employees). Example tasks, as illustrated in association with operation 406, can include creating a user, verifying a domain, changing a Domain Name Controller (DNC), connecting a client device, migrating data, etc.

At 408, a state diagram 222 (e.g., a finite state machine) that models dependencies between individual tasks in the set of tasks 118 is generated. The state diagram 222 comprises a non-linear model that provides various paths that can be followed to move the client organization 104 from the current environment 120 to the target environment 122 (e.g., a path comprises an execution order of nodes where an individual node in the state diagram represents a task).

Figure 5:
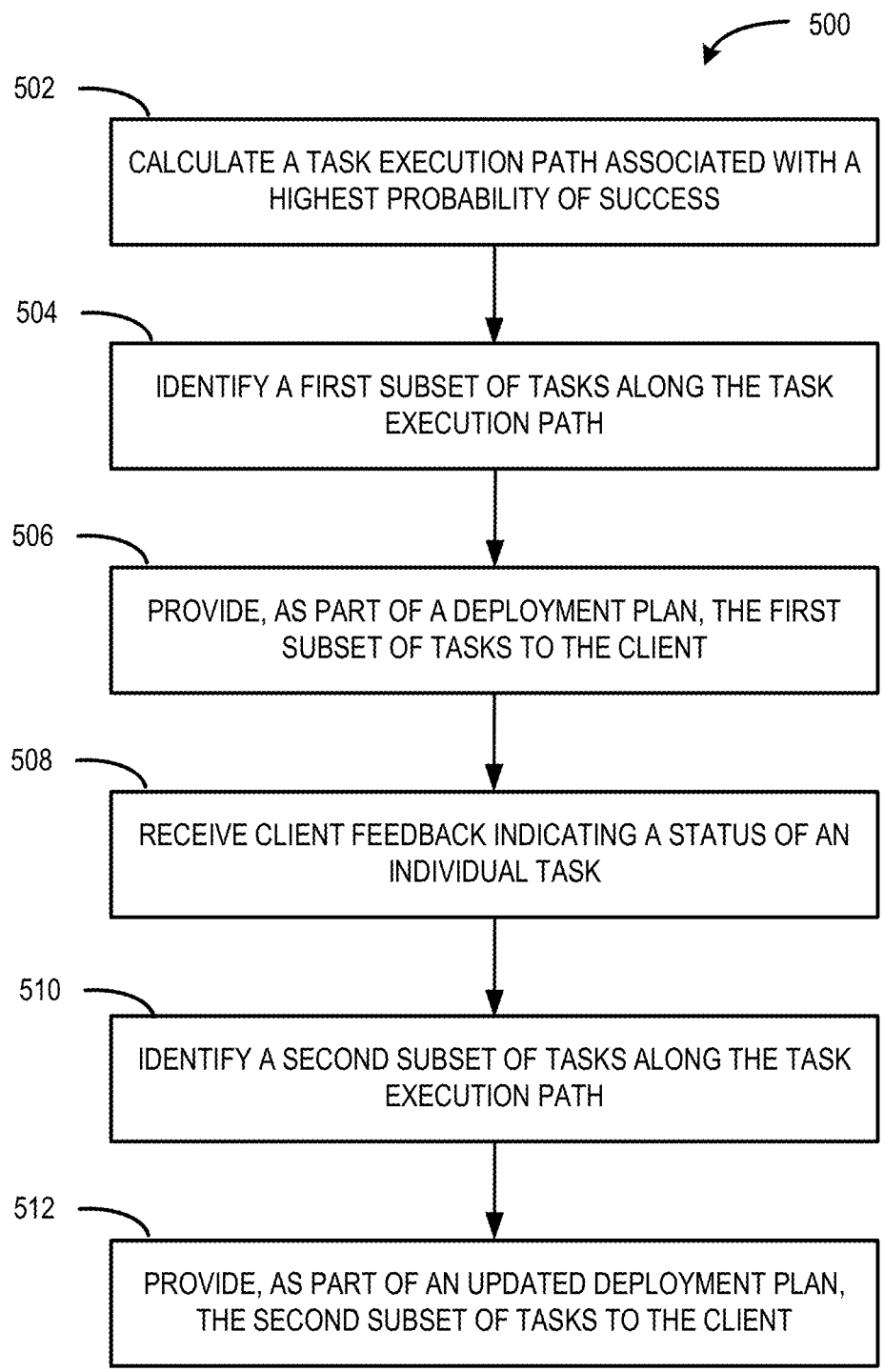
FIG. 5 illustrates a flow diagram of an example process that calculates a task execution path associated with a highest probability of success for onboarding the service to the network computing infrastructure, and that updates a deployment plan based on client feedback.

FIG. 5 illustrates a flow diagram of an example process 500 that calculates a task execution path associated with a highest probability of success for onboarding the service to the network computing infrastructure 108, and that updates a deployment plan based on client feedback.

At 502, a task execution path associated with a highest probability of success in moving from the current environment 120 to the target environment 122 is calculated. For instance, the deployment plan module 212 can perform statistical inferences into the onboarding information 224 to calculate a probability of successful completion of the task based on whether or not other tasks have been successfully completed. The task identification module 218 evaluates the respective probabilities (e.g., individually and as a combination as the probabilities build on each other) to determine a task execution path in the state diagram 222 that provides a highest probability of success.

At 504, a first subset of tasks along the task execution path is identified. In various examples, a number of tasks in the first subset is associated with a threshold number (e.g., one task, two tasks, three tasks, four tasks, etc.). The threshold number can be pre-set, in accordance with a particular service and a particular segment, to a small number of tasks (e.g., rather than a long and an exhaustive list of hundreds of tasks) to reduce or eliminate the likelihood that that a client organization 104 becomes overwhelmed and disengages from the onboarding engagement session 116.

At 506, the first subset of tasks is provided, to the client organization 104, as part of a deployment plan.

Figure 7:
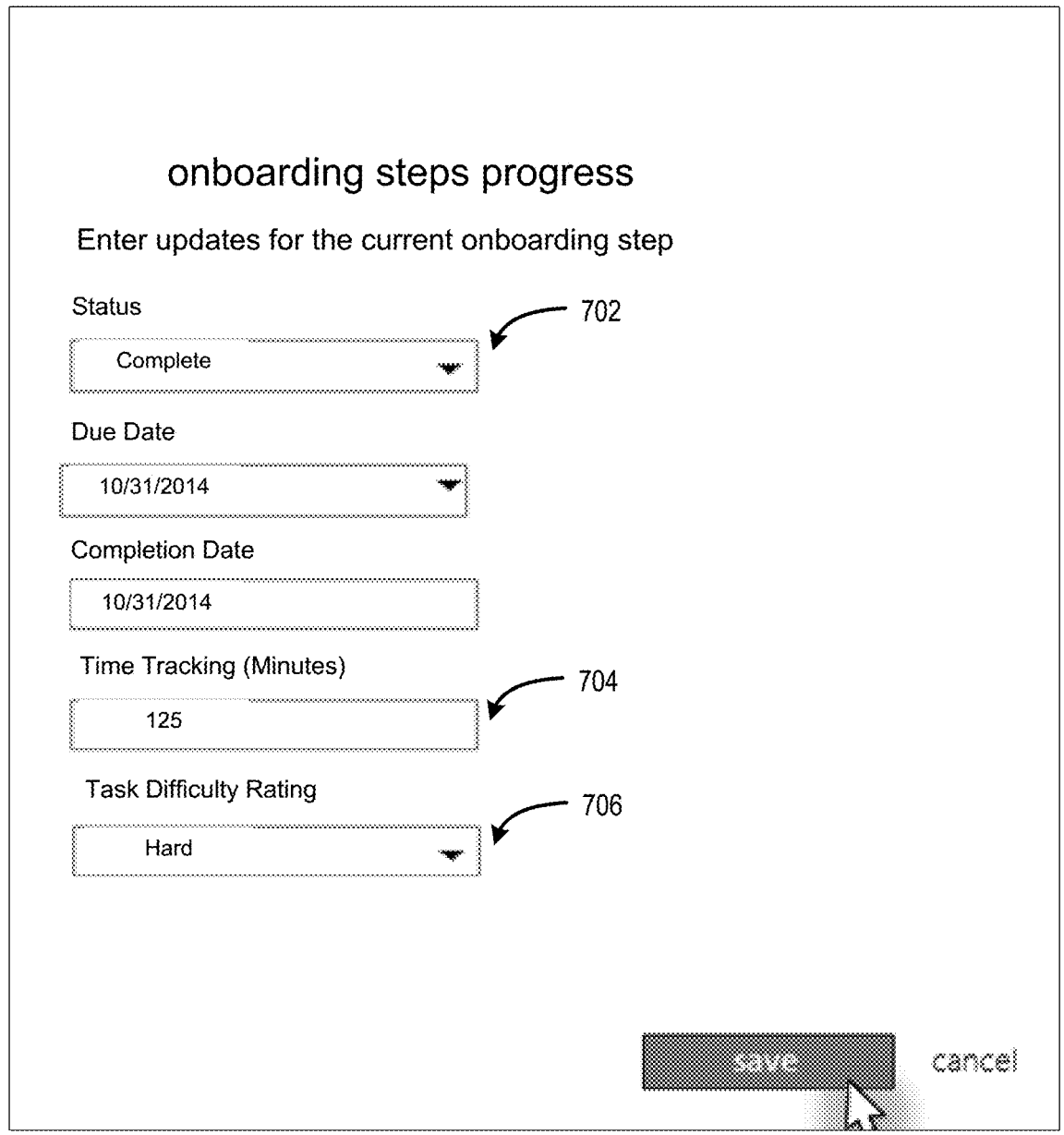
FIG. 7 illustrates an example graphical user interface that an individual user of a client organization and/or a service provider that is involved in an onboarding engagement session can use to provide feedback on an individual task.

At 508, client feedback is received, the client feedback indicating a status of an individual task (e.g., successful completion, non-completion or unsuccessful completion, a delay, etc.). FIG. 7 illustrates an example user interface that can be used to provide the client feedback.

At 510, a second subset of tasks along the task execution path is identified. Similar to the first subset of tasks, a number of tasks in the first subset can be associated with a threshold number.

At 512, the second subset of tasks is provided, to the client organization 104, as part of an updated deployment plan.

Figure 6:
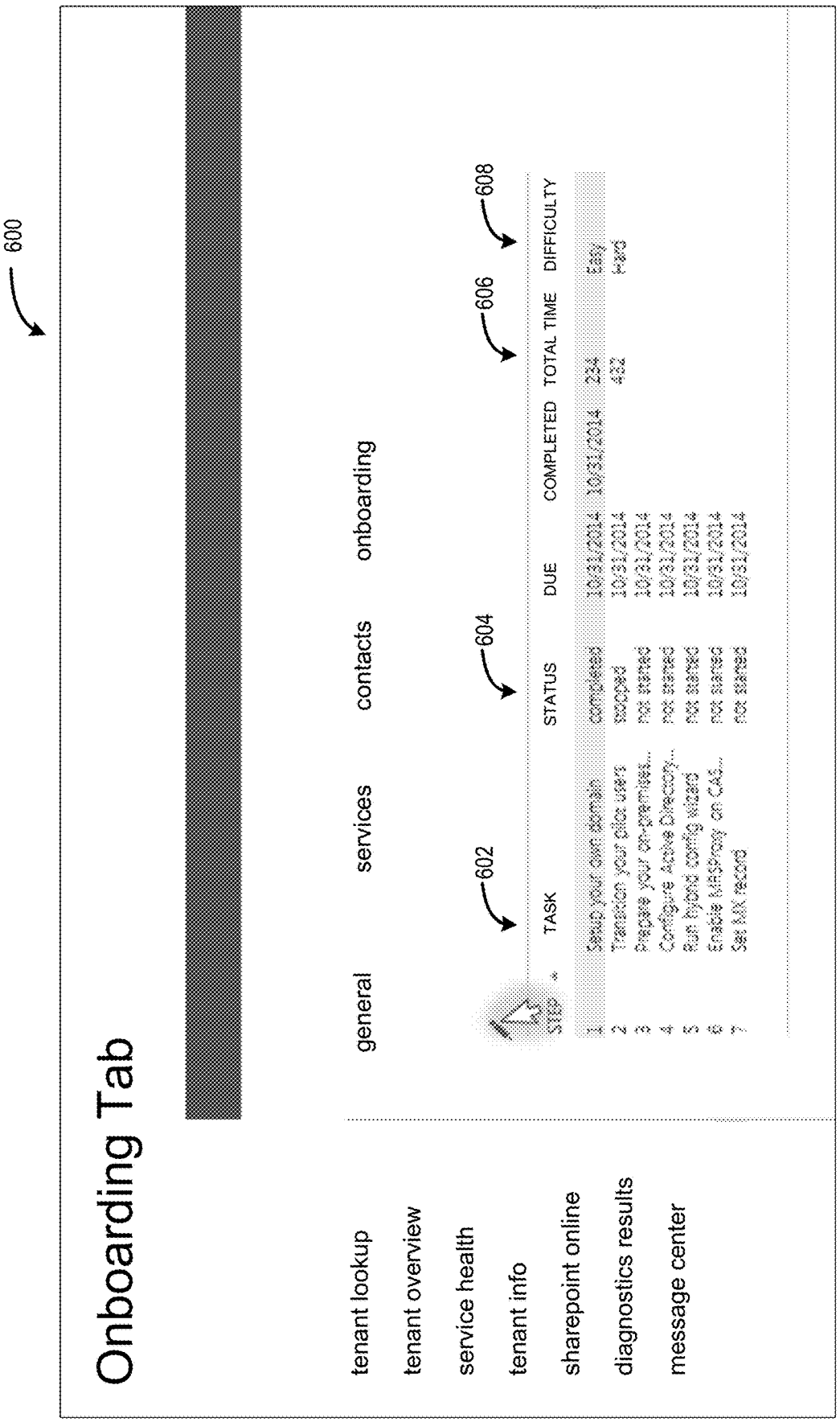
FIG. 6 illustrates an example graphical user interface that a client organization and/or a service provider can use to view a list of tasks to be completed and/or a status of an individual task.

FIG. 6 illustrates an example graphical user interface 600 that a client organization 104 and/or a service provider 102 can use to view a list of tasks to be completed and/or a status of an individual task. A first portion 602 of the example graphical user interface 600 lists tasks (e.g., the first subset or the second subset) that are part of a deployment plan or an updated deployment plan. A second portion 604 of the example graphical user interface 600 indicates the status of the tasks listed in the first portion 602 (e.g., "completed", "stopped", "not started", etc.). In various implementations, the observation module 208 may determine that a "stopped" task is associated with unsuccessful completion of the task (e.g., the client encountered an error, the client is having difficulty completing the task, the client is taking longer than expected to complete the task, etc.). A third portion 606 of the example graphical user interface 600 indicates an amount of time it takes to complete an individual task. As described above, this information can be stored and aggregated for a particular segment, and used to determine an expected amount of time to complete a particular task 312. Finally, a fourth portion 608 of the example graphical user interface 600 indicates a difficulty in completing the task (e.g., "easy", "hard", etc.). In various examples, this indication of difficulty comprises a client sentiment, and can be used as a factor when calculating the probabilities for each node in a state diagram 222.

FIG. 7 illustrates an example graphical user interface 700 that an individual user of a client organization 104 and/or a service provider 102 that is involved in an onboarding engagement session can use to provide feedback on an individual task. For example, at entry window 702, the individual user can enter a status of the task (e.g., "successfully completed", "unsuccessfully completed", "in-progress", etc.). At entry window 704, the individual user can enter an amount of time it takes to complete an individual task. At entry window 706, the individual user can enter a difficulty indication associated with completion, or non-completion, of the task. The information can be stored in the database 300 in association with the service being onboarded and a particular segment.

Figure 8:
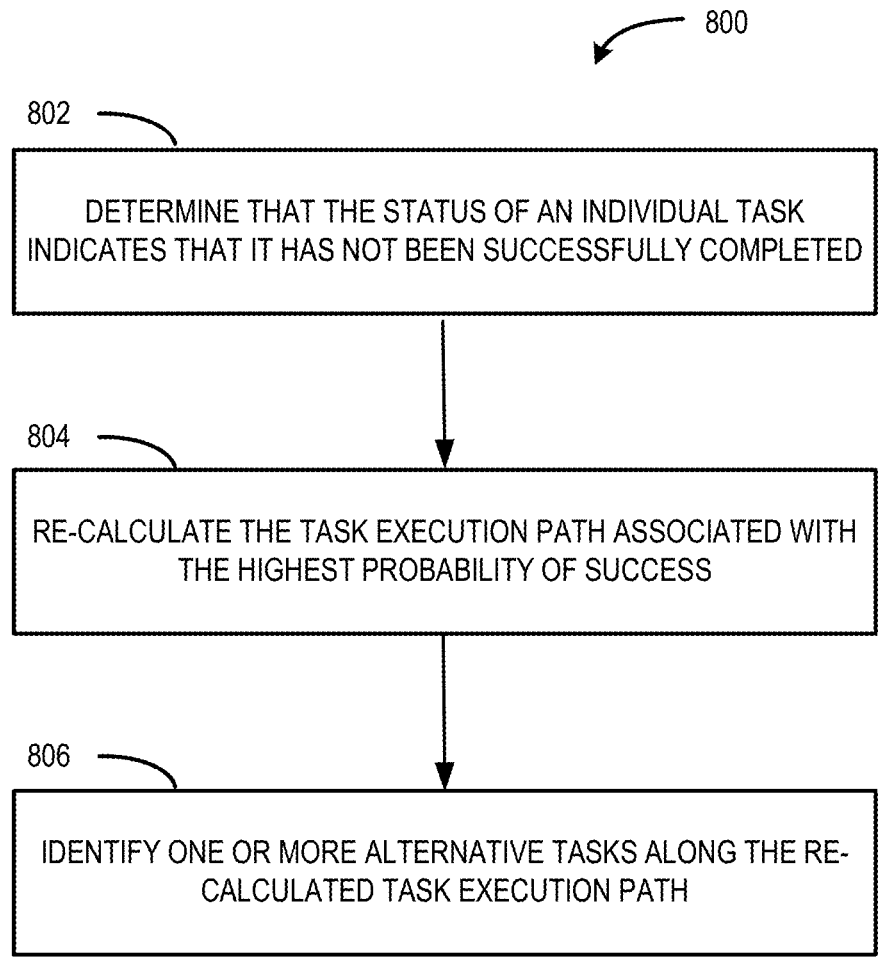
FIG. 8 illustrates a flow diagram of an example process that re-calculates the task execution path based on client feedback indicating that an individual task has not been successfully completed.

FIG. 8 illustrates a flow diagram of an example process 800 that re-calculates the task execution path based on client feedback indicating that an individual task has not been successfully completed. Example process 800 can be implemented in association with operations 508 and 510 in FIG. 5.

At 802, it is determined that the status of an individual task indicates that it has not been successfully completed. In various examples, the status is determined based on client feedback, and the task that has not been completed can be a task in the first ordered subset of tasks of FIG. 5. As described above, based on the client feedback, the task status module 220 can update nodes in the state diagram 222 so that the tasks attempted to be implemented by the client organization are labeled as being "successfully completed" or "unsuccessfully completed".

At 804, the task execution path associated with the highest probability of success is re-calculated. For example, the task identification module 218 can re-calculate the probabilities within the state diagram 222 and the task execution path after the state diagram 222 is updated to indicate that the task has not been successfully completed. Therefore, the initial task execution path calculated prior to selection of the first subset of tasks may be different than a subsequent task execution path that is re-calculated after receiving input indicates that a task was not successfully completed.

At 806, one or more alternative tasks along the re-calculated task execution path are identified. In various examples, the one or more alternative tasks are the second subset of tasks identified in operation 510 of FIG. 5. Accordingly, in instances where the task execution path changes (e.g., via re-calculation), the one or more alternative tasks are selected instead of other tasks along the task execution path that would have been selected if the task execution path had not been re-calculated.

The operations in FIG. 5 and/or FIG. 8 can be iterative such that the deployment plan module 212 can continuously recommend a subsets of tasks (e.g., a small number of tasks such as one task, two tasks, three tasks, four tasks, five tasks, and so forth) based on input indicating successful or unsuccessful completion of previous tasks. This more refined and granular assisted approach to onboarding based on continuous re-evaluation of the task execution path with the highest probability of success results in higher client satisfaction and engagement.

Figure 9:
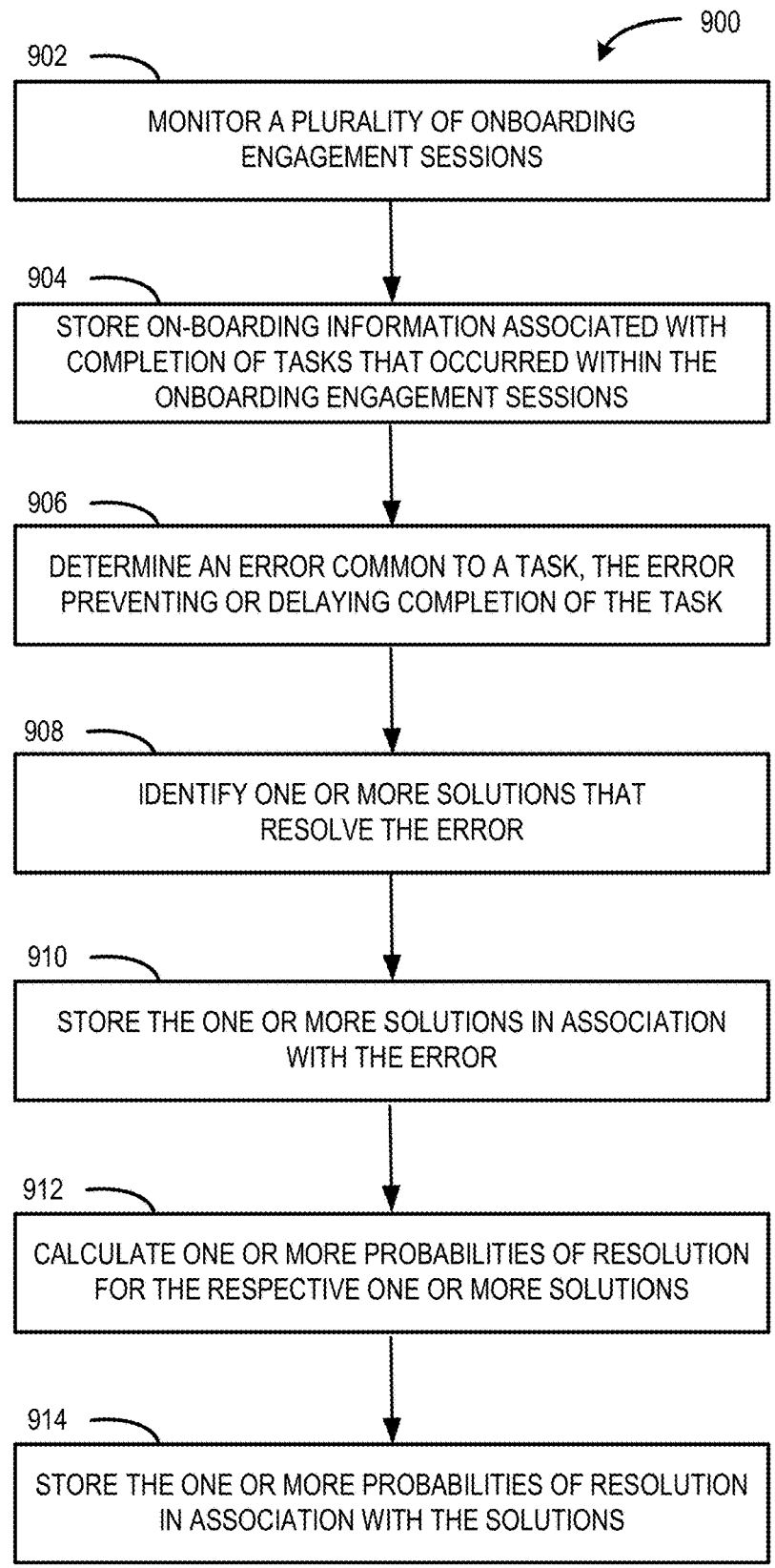
FIG. 9 illustrates a flow diagram of an example process that determines an error that is common to multiple onboarding engagement sessions and identifies solutions to the error.

FIG. 9 illustrates a flow diagram of an example process 900 that an error that is common to multiple onboarding engagement sessions and identifies solutions to the error.

At 902, a plurality of onboarding engagement sessions is monitored and/or information based on the monitoring is received. As described above, the observation module 208 is configured to monitor, or receive, information associated with a plurality of onboarding engagement sessions (e.g., completion of tasks, time to complete tasks, difficulty in completing tasks, etc.).

At 904, information associated with completion of tasks within the plurality of onboarding engagement sessions is stored.

At 906, an error common to a task from at least some of the plurality of onboarding engagement sessions is determined. For example, an error can prevent or delay completion of the task (based on evaluation of timing). Accordingly, in various examples, the error module 214 is configured to evaluate the stored information (e.g., the onboarding information 224) and determine that multiple client organizations were unsuccessful or delayed in completing the task. The error module 214 can analyze the stored information to determine a common error that causes the delay or prevents the client organizations from completing the task.

At 908, solutions that resolve the error are identified. For instance, the solution module 216 can analyze the stored information and identify one or more solutions that were implemented by the client organizations to resolve the error (e.g., previous actions taken to resolve the error).

At 910, the one or more solutions associated are stored in association with the common error. In various examples, an error and a solution can each be added to a supervised data set for incremental learning (e.g., machine learning) and for probabilistic determination of an optimal next step (e.g., for subsequent onboarding engagement sessions).

At 912, for each solution, a probability that the solution resolves the error is calculated. For example, a first solution may have been implemented to resolve the common error in a first number of onboarding engagement sessions (e.g., fifty out of one hundred or 50%), while a second solution may have been implemented to resolve the common error in a second number of onboarding engagement sessions (e.g., thirty out of one hundred or 30%).

At 914, the probabilities are stored in association with their respective solutions.

Figure 10:
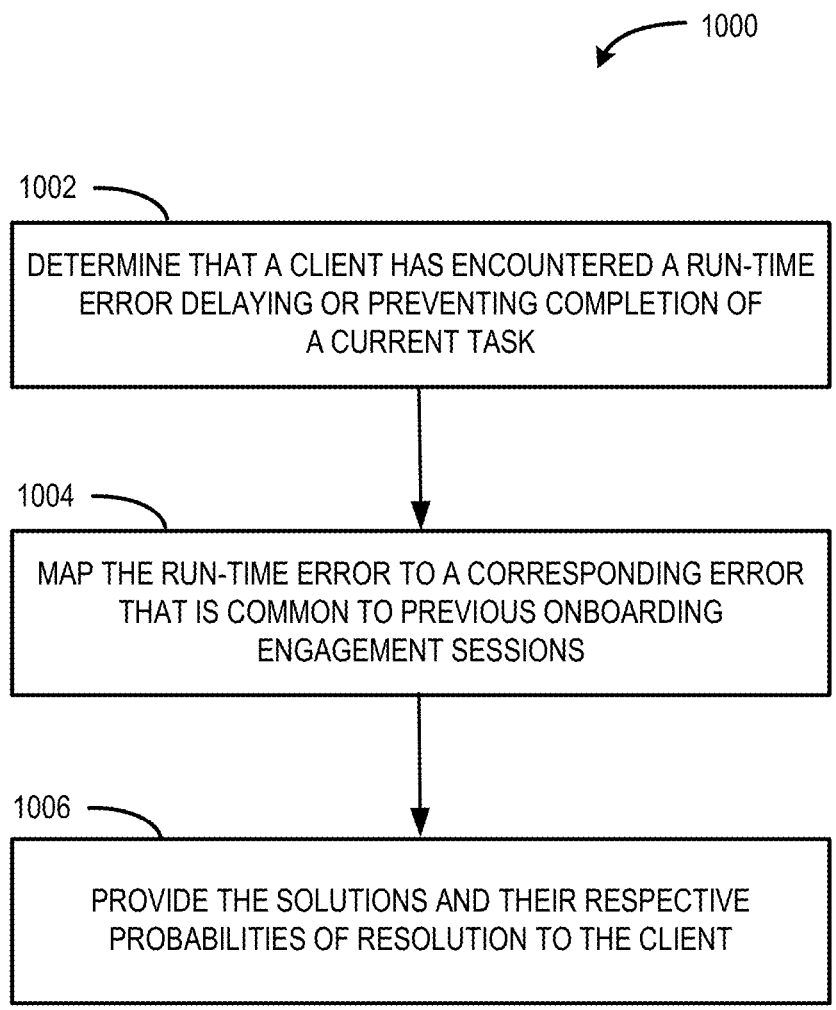
FIG. 10 illustrates a flow diagram of an example process that provides solutions in response to determining an occurrence of a run-time error in a current onboarding engagement session.

FIG. 10 illustrates a flow diagram of an example process 1000 that provides solutions in response to determining an occurrence of a run-time error in a current onboarding engagement session.

At 1002, it is determined that a client has encountered a run-time error during implementation of a deployment plan. As an example, the error module 214 can detect the run-time error in response to determining that a current task has not been successfully completed within an expected amount of time to complete the task.

At 1004, the run-time error is mapped to a corresponding error that is common to previous onboarding engagement sessions.

At 1006, the solutions and their respective probabilities of resolution are provided to the client organization in response to determining that the client has encountered the run-time error. In various examples, the solution module 216 can provide a recommended solution (e.g., a solution with the highest resolution probability). Moreover, the solution module 216 can provide a resolution probability as a confidence rating.

Figure 11:
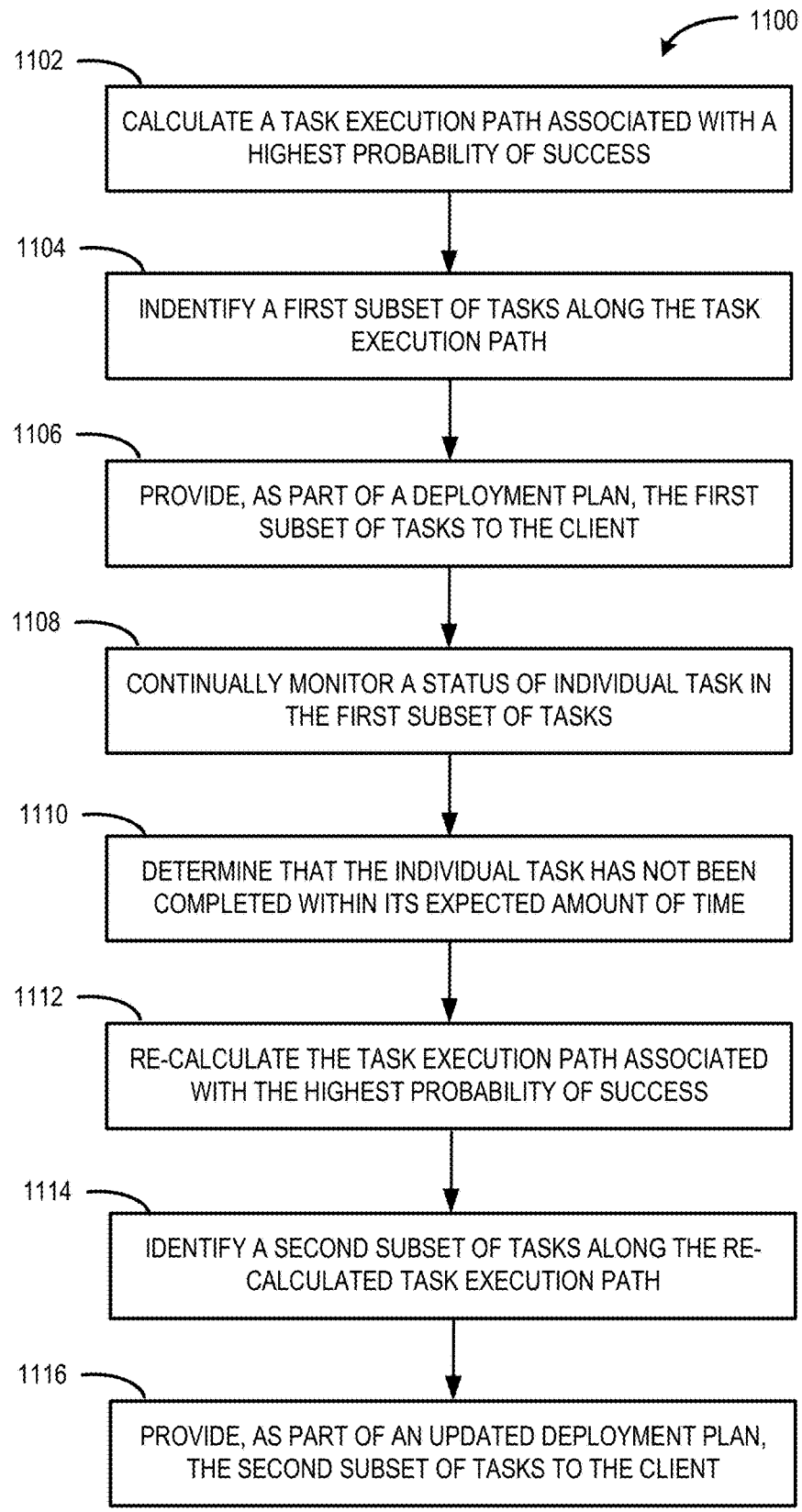
FIG. 11 illustrates a flow diagram of an example process that calculates a task execution path associated with a highest probability of success for onboarding the service to the network computing infrastructure, and that updates a deployment plan based on automated and continuous monitoring of a status of an individual task.

FIG. 11 illustrates a flow diagram of an example process 1100 that calculates a task execution path associated with a highest probability of success for onboarding the service to the network computing infrastructure, and that updates a deployment plan based on automated and continuous monitoring of a status of an individual task.

At 1102, a task execution path associated with a highest probability of success in moving from the current environment 120 to the target environment 122 is calculated. For instance, the deployment plan module 212 can perform statistical inferences into the onboarding information 224 to calculate a probability of successful completion of the task based on whether or not other tasks have been successfully completed. The task identification module 218 evaluates the respective probabilities (e.g., individually and as a combination as the probabilities build on each other) to determine a task execution path in the state diagram 222 that provides a highest probability of success.

At 1104, a first subset of tasks along the task execution path is identified.

At 1106, the first subset of tasks is provided, to the client organization 104, as part of a deployment plan.

At 1108, a status of an individual task in the first subset of task is automatically and continuously monitored and/or information associated with the monitoring is received.

At 1110, it is determined that an individual task in the first subset of tasks has not been completed within its expected amount of time to complete. In contrast to the explicit feedback provided by the client in operation 508 of FIG. 5, the input received here is based on automated and continuous monitoring.

At 1112, the task execution path associated with the highest probability of success is re-calculated.

At 1114, a second subset of tasks along the re-calculated task execution path is identified. Similar to the first subset of tasks, a number of tasks in the first subset can be associated with a threshold number.

At 1116, the second subset of tasks is provided, to the client organization 104, as part of an updated deployment plan. Consequently, the stored onboarding information 224 can be used to implement supervised learning and to guide an autonomous onboarding process based on a learned probability that completion of selected next task(s) effectively moves the client organization to full engagement.

Figure 12:
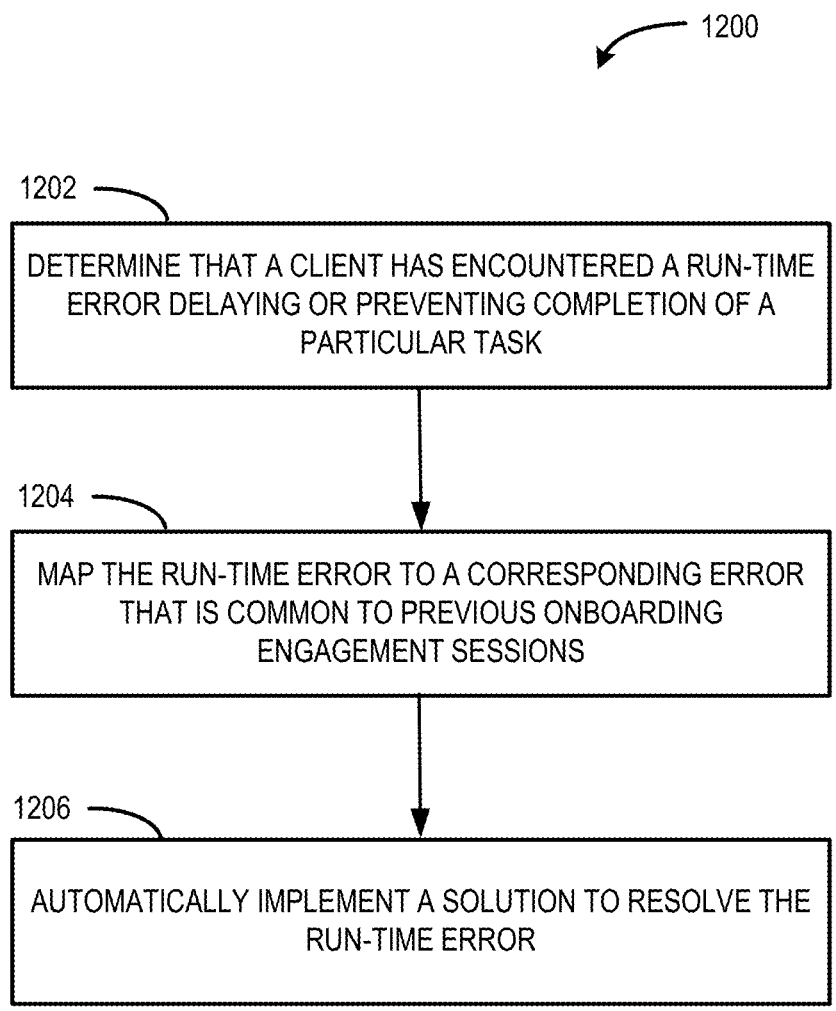
FIG. 12 illustrates a flow diagram of an example process that automatically identifies and implements a solution in response to determining an occurrence of a run-time error in a current onboarding engagement session.

FIG. 12 illustrates a flow diagram of an example process 1200 that automatically identifies and implements a solution in response to determining an occurrence of a run-time error in a current onboarding engagement session.

At 1202, it is determined that a client has encountered a run-time error during implementation of a deployment plan. As an example, the error module 214 can detect the run-time error in response to determining that a current task has not been successfully completed within an expected amount of time to complete the task.

At 1204, the run-time error is mapped to a corresponding error that is common to previous onboarding engagement sessions.

At 1206, the service provider 1206 takes action to automatically resolve the runt-time error based on one of the solutions.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Example A, one or more devices comprising: one or more processors; and a memory having computer-executable instructions stored thereupon which, when executed by the one or more processors, cause the one or more devices to: monitor a plurality of onboarding engagement sessions, wherein an individual onboarding engagement session comprises tasks to move at least part of a service from client-managed computing infrastructure to network computing infrastructure; store, in a database and based at least in part on the monitoring, onboarding information associated with completion of the tasks for the plurality of onboarding engagement sessions; determine an error common to a task from at least some of the plurality of onboarding engagement sessions, wherein the error prevents or delays completion of the task; identify, based at least in part on the onboarding information, one or more solutions that individually have the potential to resolve the error; and store, in the database and in association with the error, the one or more solutions.

Example B, the one or more devices of Example A, wherein the computer-executable instructions further cause the one or more devices to: determine that a client organization has encountered a run-time error associated with a current task of a current onboarding engagement session, the run-time error delaying or preventing completion of the current task; map the run-time error to the error stored in the database that is common to the at least some of the plurality of onboarding engagement sessions; and provide the one or more solutions and the respective one or more probabilities of resolution to the client organization in response to determining that the client organization has encountered the run-time error.

Example C, the one or more devices of Example B, wherein the computer-executable instructions further cause the one or more devices to recommend a recommended solution of the one or more solutions.

Example D, the one or more devices of Example B or Example C, wherein the computer-executable instructions further cause the one or more devices to: determine that the task was not successfully completed within an expected amount of time to complete the task; and determine that the client organization has encountered the run-time error in response to determining that the task was not successfully completed within the expected amount of time to complete the task.

Example E, the one or more devices of any one of Examples A through D, wherein the computer-executable instructions further cause the one or more devices to: calculate, for an individual solution of the one or more solutions, a probability of resolution; store, in the database, the respective probabilities of resolution; and provide, as confidence ratings, the respective probabilities of resolution.

Example F, the one or more devices of any one of Examples A through E, wherein the error is specific to a particular segment of a plurality of different segments based on a size of a client organization, wherein the onboarding information is stored in the database for the particular segment of the plurality of different segments.

Example G, the one or more devices of any one of Examples A through F, wherein at least one solution of the one or more solutions comprises instructions to interact with a third-party system to enable completion of the task.

Example H, a method comprising: monitoring a plurality of onboarding engagement sessions, wherein an individual onboarding engagement session comprises tasks to move at least part of a service from client-managed computing infrastructure to network computing infrastructure; storing, in a database and based at least in part on the monitoring, onboarding information associated with completion of the tasks for the plurality of onboarding engagement sessions; determining, by one or more processors, an error common to a task from at least some of the plurality of onboarding engagement sessions, wherein the error prevents or delays completion of the task; identifying, based at least in part on the onboarding information, one or more solutions that individually have the potential to resolve the error; and storing, in the database and in association with the error, the one or more solutions.

Example I, the method of Example H, further comprising: determining that a client organization has encountered a run-time error associated with a current task of a current onboarding engagement session, the run-time error delaying or preventing completion of the current task; mapping the run-time error to the error stored in the database that is common to the at least some of the plurality of onboarding engagement sessions; and providing the one or more solutions to the client organization in response to determining that the client organization has encountered the run-time error.

Example J, the method of Example I, further comprising recommending a recommended solution of the one or more solutions.

Example K, the method of Example I or Example J, further comprising: determining that the task was not successfully completed within an expected amount of time to complete the task; and determining that the client organization has encountered the run-time error in response to determining that the task was not successfully completed within the expected amount of time to complete the task.

Example L, the method of any one of Examples H through K, further comprising: calculating, for an individual solution of the one or more solutions, a probability of resolution; storing, in the database, the respective probabilities of resolution; and providing, as confidence ratings, the respective probabilities of resolution.

Example M, the method of any one of Examples H through L, wherein the error is specific to a particular segment of a plurality of different segments based on a size of a client organization, wherein the onboarding information is stored in the database for the particular segment of the plurality of different segments.

Example N, the method of any one of Examples H through M, wherein at least one solution of the one or more solutions comprises instructions to interact with a third-party system to enable completion of the task.

Example O, one or more computer-readable storage media storing computer-executable instructions which, when executed by a processor, cause a device to: monitor a plurality of onboarding engagement sessions, wherein an individual onboarding engagement session comprises tasks to move at least part of a service from client-managed computing infrastructure to network computing infrastructure; store, in a database and based at least in part on the monitoring, onboarding information associated with completion of the tasks for the plurality of onboarding engagement sessions; determine an error common to a task from at least some of the plurality of onboarding engagement sessions, wherein the error prevents or delays completion of the task; identify, based at least in part on the onboarding information, one or more solutions that individually have the potential to resolve the error; and store, in the database and in association with the error, the one or more solutions.

Example P, the one or more computer-readable storage media of Example O, wherein the computer-executable instructions further cause the device to: determine that a client organization has encountered a run-time error associated with a current task of a current onboarding engagement session, the run-time error delaying or preventing completion of the current task; map the run-time error to the error stored in the database that is common to the at least some of the plurality of onboarding engagement sessions; and provide the one or more solutions in response to determining that the client organization has encountered the run-time error.

Example Q, the one or more computer-readable storage media of Example P, wherein the computer-executable instructions further cause the device to recommend a recommended solution of the one or more solutions.

Example R, the one or more computer-readable storage media of Example P or Example Q, wherein the computer-executable instructions further cause the device to: determine that the task was not successfully completed within an expected amount of time to complete the task; and determine that the client organization has encountered the run-time error in response to determining that the task was not successfully completed within the expected amount of time to complete the task.

Example S, the one or more computer-readable storage media of any one of Examples O through R, wherein the computer-executable instructions further cause the device to: calculate, for an individual solution of the one or more solutions, a probability of resolution; store, in the database, the respective probabilities of resolution; and provide, as confidence ratings, the respective probabilities of resolution.

Example T, the one or more computer-readable storage media of any one of Examples O through S, wherein the error is specific to a particular segment of a plurality of different segments based on a size of a client organization, wherein the onboarding information is stored in the database for the particular segment of the plurality of different segments.

CONCLUSION

In closing, although the various implementations may have been described in language specific to structural features and/or methodological acts, it is to be understood that the subject matter described is not necessarily limited to the specific features or acts described. Rather, the specific features and acts are disclosed as example forms of implementing the claimed subject matter.

What is claimed is:

1. A system comprising:
one or more processors; and
a memory having computer-executable instructions stored thereupon which, when executed by the one or more processors, cause the system to:
monitor an onboarding engagement session that comprises tasks to move at least part of a service from client-managed resources to network resources;
detect an error based on a determination that an individual task was not successfully completed within an expected amount of time to complete the individual task, wherein the expected amount of time to complete the individual task is calculated as an average of actual times it takes to complete the individual task in previous onboarding sessions;
identify one or more solutions that have been implemented in the previous onboarding engagement sessions to resolve the error; and
take action to resolve the error by implementing at least one solution of the one or more solutions.

2. The system of claim 1, wherein the computer-executable instructions further cause the system to display, on a graphical user interface, a status of the individual task indicating that the error is preventing or delaying completion of the individual task.

3. The system of claim 1, wherein the computer-executable instructions further cause the system to calculate a probability of resolution for each of the one or more solutions.

4. The system of claim 3, wherein the at least one solution is selected from the one or more solutions based on having a highest probability of resolution.

5. The system of claim 1, wherein the computer-executable instructions further cause the system to recommend the at least one solution of the one or more solutions.

6. The system of claim 1, wherein the error is specific to a particular segment of a plurality of different segments based on a size of a client organization, and the one or more solutions are stored in a database for the particular segment of the plurality of different segments.

7. The system of claim 1, wherein the at least one solution of the one or more solutions comprises instructions to interact with a third-party system to enable completion of the individual task.

8. A method comprising:
monitoring an onboarding engagement session that comprises tasks to move at least part of a service from client-managed resources to network resources;
detecting an error based on a determination that an individual task was not successfully completed within an expected amount of time to complete the individual task, wherein the expected amount of time to complete the individual task is calculated as an average of actual times it takes to complete the individual task in previous onboarding sessions;
identifying, by one or more processors, one or more solutions that have been implemented in the previous onboarding engagement sessions to resolve the error; and
taking action to resolve the error by implementing at least one solution of the one or more solutions.

9. The method of claim 8, further comprising displaying, on a graphical user interface, a status of the individual task indicating that the error is preventing or delaying completion of the individual task.

10. The method of claim 8, further comprising calculating a probability of resolution for each of the one or more solutions.

11. The method of claim 10, wherein the at least one solution is selected from the one or more solutions based on having a highest probability of resolution.

12. The method of claim 8, further comprising recommending the at least one solution of the one or more solutions.

13. The method of claim 8, wherein the error is specific to a particular segment of a plurality of different segments based on a size of a client organization, and the one or more solutions are stored in a database for the particular segment of the plurality of different segments.

14. The method of claim 8, wherein the at least one solution of the one or more solutions comprises instructions to interact with a third-party system to enable completion of the individual task.

15. One or more non-transitory computer-readable storage media storing computer-executable instructions which, when executed by one or more processors, cause a system to perform operations comprising:
monitoring an onboarding engagement session that comprises tasks to move at least part of a service from client-managed resources to network resources;
detecting an error based on a determination that an individual task was not successfully completed within an expected amount of time to complete the individual task, wherein the expected amount of time to complete the individual task is calculated as an average of actual times it takes to complete the individual task in previous onboarding sessions;

identifying one or more solutions that have been implemented in the previous onboarding engagement sessions to resolve the error; and taking action to resolve the error by implementing at least one solution of the one or more solutions.

16. The one or more non-transitory computer-readable storage media of claim 15, wherein the operations further comprise displaying, on a graphical user interface, a status of the individual task indicating that the error is preventing or delaying completion of the individual task.

17. The one or more non-transitory computer-readable storage media of claim 15, wherein the operations further comprise calculating a probability of resolution for each of the one or more solutions.

18. The one or more non-transitory computer-readable storage media of claim 17, wherein the at least one solution is selected from the one or more solutions based on having a highest probability of resolution.

19. The one or more non-transitory computer-readable storage media of claim 15, wherein the error is specific to a particular segment of a plurality of different segments based on a size of a client organization, and the one or more solutions are stored in a database for the particular segment of the plurality of different segments.

20. The one or more non-transitory computer-readable storage media of claim 15, wherein the at least one solution of the one or more solutions comprises instructions to interact with a third-party system to enable completion of the individual task.

* * * * *